(12) United States Patent
Poole et al.

(10) Patent No.: US 10,748,239 B1
(45) Date of Patent: Aug. 18, 2020

(54) METHODS AND APPARATUS FOR GPU CONTEXT REGISTER MANAGEMENT

(71) Applicant: QUALCOMM Incorporated, San Diego, CA (US)

(72) Inventors: Nigel Poole, West Newton, MA (US); Xuefeng Tang, San Diego, CA (US); Jian Liang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/290,761

(22) Filed: Mar. 1, 2019

(51) Int. Cl.
  *G06T 1/20* (2006.01)
  *G06T 1/60* (2006.01)

(52) U.S. Cl.
  CPC . *G06T 1/20* (2013.01); *G06T 1/60* (2013.01)

(58) Field of Classification Search
  CPC ......... G06T 15/005; G06T 1/20; G06T 15/04; G06T 1/60; G09G 5/363; G09G 5/393
  See application file for complete search history.

(56) References Cited

U.S. PATENT DOCUMENTS 9,990,766 B2   6/2018  Jia et al.
10,002,021 B2*  6/2018  Metz ..................... G06F 9/4806
10,109,099 B2  10/2018  Johnson et al.
2018/0096446 A1  4/2018  Chen et al.
2020/0013137 A1*  1/2020  Hammerstone ......... G06T 11/20

FOREIGN PATENT DOCUMENTS

WO   2017058331 A1   4/2017

OTHER PUBLICATIONS

Wyse M., "Understanding GPGPU Vector Register File Usage", 2018, 11 pages.

* cited by examiner

*Primary Examiner* — Todd Buttram
(74) *Attorney, Agent, or Firm* — Arent Fox, LLP

(57) ABSTRACT

The present disclosure relates to methods and apparatus of operation of a processing unit. The apparatus can update a first context register of one or more context registers based on a first programming state. In some aspects, the one or more context registers can be associated with at least one processing unit cluster in a graphics processing pipeline of the processing unit. The apparatus can execute a first draw call function corresponding to the first programming state. The apparatus can determine whether at least one additional first draw call function corresponds to the first programming state. In some aspects, the at least one additional first draw call function can follow the first draw call function in the graphics processing pipeline. Also, the apparatus can execute the at least one additional first draw call function when the at least one additional first draw call function corresponds to the first programming state.

25 Claims, 11 Drawing Sheets

US 10,748,239 B1

METHODS AND APPARATUS FOR GPU CONTEXT REGISTER MANAGEMENT

TECHNICAL FIELD

The present disclosure relates generally to processing systems and, more particularly, to one or more techniques for graphics processing.

INTRODUCTION

Computing devices often utilize a graphics processing unit (GPU) or other type of processor to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a GPU. The apparatus can update a first context register of one or more context registers based on a first programming state. In some aspects, the one or more context registers can be associated with at least one processing unit cluster in a graphics processing pipeline of the GPU. The apparatus can also execute a first draw call function corresponding to the first programming state. Additionally, the apparatus can determine whether at least one additional first draw call function corresponds to the first programming state. In some aspects, the at least one additional first draw call function can follow the first draw call function in the graphics processing pipeline. Also, the apparatus can execute the at least one additional first draw call function when the at least one additional first draw call function corresponds to the first programming state.

Moreover, the apparatus can update a second context register of the one or more context registers based on a second programming state. The apparatus can also execute a second draw call function corresponding to the second programming state of the second context register. In some aspects, the second draw call function can follow the at least one additional first draw call function in the graphics processing pipeline. Further, the apparatus can determine whether at least one additional second draw call function corresponds to the second programming state of the second context register. In some aspects, the at least one additional second draw call function can follow the second draw call function in the graphics processing pipeline. Also, the apparatus can execute the at least one additional second draw call function when the at least one additional second draw call function corresponds to the second programming state of the second context register.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
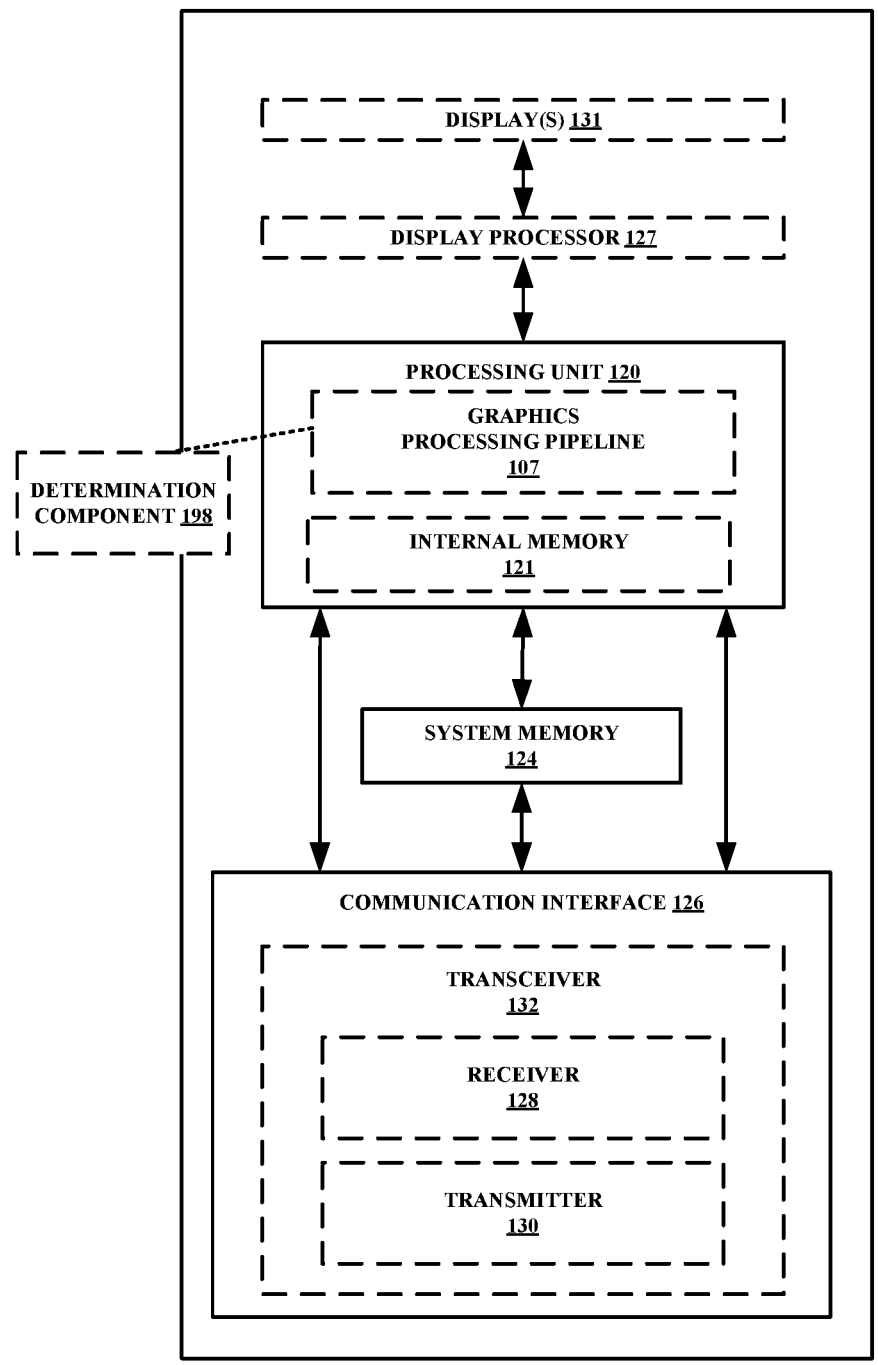
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to the term "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

As used herein, instances of the term "content" may refer to graphical content or display content. In some examples, as used herein, the term "graphical content" may refer to a content generated by a processing unit configured to perform graphics processing. For example, the term "graphical content" may refer to content generated by one or more processes of a graphics processing pipeline. In some examples, as used herein, the term "graphical content" may refer to content generated by a graphics processing unit. In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

GPUs according to the present disclosure can include multiple context registers, e.g., to store the programming or context state for the execution of draw calls. In some aspects, draw calls herein can alternate between the use of two context registers. When alternating between context registers, there may not be any delays if the draw call execution time is at least as long as the programming time. However, a draw call delay can occur when the previous draw call execution time is short, and thus cannot hide the time needed for programming a subsequent draw call. For example, delays can be experienced if draw calls are shorter than the length of the subsequent programming time. This alternating behavior can also limit the ability to program in advance. For instance, if there are only two context registers, it may not be possible to program a sequence that is more than one draw call in advance of the current draw call.

GPUs according to the present disclosure can utilize context reuse to solve the aforementioned problem of delays experienced between the execution of consecutive draw calls. For instance, after determining that there are no programming updates for the latter of consecutive draw calls, the latter draw call can utilize the same programming or context register as the previous draw call. By not updating the programming for the latter draw call, this allows the programming for the next draw call to begin without waiting on a currently executing draw call. By utilizing context reuse, GPUs according to the present disclosure can reduce delays between the execution of consecutive draw calls.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a system memory 124, a communication interface 126, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120, such as system memory 124, may be accessible to the processing unit 120. For example, the processing unit 120 may be configured to read from and/or write to external memory, such as the system memory 124. The processing unit 120 may be communicatively coupled to the system memory 124 over a bus. In some examples, the processing unit 120 may be communicatively coupled to each other over the bus or a different connection.

The internal memory 121 and/or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to update a first context register of one or more context registers based on a first programming state. In some aspects, the one or more context registers can be associated with at least one processing unit cluster in the graphics processing pipeline 107 of the processing unit 120 (e.g., a GPU). The determination component 198 can also be configured to execute a first draw call function corresponding to the first programming state. Additionally, the determination component 198 can be configured to determine whether at least one additional first draw call function corresponds to the first programming state. In some aspects, the at least one additional first draw call function can follow the first draw call function in the graphics processing pipeline. Also, the determination component 198 can be configured to execute the at least one additional first draw call function when the at least one additional first draw call function corresponds to the first programming state. Moreover, the determination component 198 can be configured to update a second context register of the one or more context registers based on a second programming state. The determination component 198 can also be configured to execute a second draw call function corresponding to the second programming state of the second context register. In some aspects, the second draw call function can follow the at least one additional first draw call function in the graphics processing pipeline 107. Further, the determination component 198 can be configured to determine whether at least one additional second draw call function corresponds to the second programming state of the second context register. In some aspects, the at least one additional second draw call function can follow the second draw call function in the graphics processing pipeline 107. Also, the determination component 198 can be configured to execute the at least one additional second draw call function when the at least one additional second draw call function corresponds to the second programming state of the second context register.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, an augmented reality device, a virtual reality device, a display or display device, a television, a television set-top box, an intermediate network device, a digital media player, a video streaming device, a content streaming device, an in-car computer, any mobile device, any device configured to generate graphical content, or any device configured to perform one or more techniques described herein.

In some aspects of a GPU, in order to drive the operation of graphics processing pipeline, e.g., graphics processing pipeline 107, a driver or software driver can provide a sequence of packets with instructions. For example, the packets can include a number of state setup and/or command instructions. For instance, the state setup instruction can initialize the state held in a number of context registers in the GPU. In some instances, the command instruction that follows the state setup instruction may be a draw command. The draw commands can use the values in the context registers to help properly control the operation of the GPU. Additionally, the command sequence may be written to a memory, e.g., by a driver, and then processed by a command processor (CP).

In some aspects, the CP can read the commands and send the state setup, e.g., programming, to the context registers. After this, the CP can send a draw command to the GPU pipeline. The draw command may take some time to execute, after which the GPU pipeline may be ready for another draw command. Moreover, the subsequent draw command may require its own state setup before it can begin executing. In some instances, a simple linear sequence of programming and executing, e.g., program, execute, program, execute, may waste valuable GPU execution time when the context registers are programmed between the draw commands.

In some aspects of a GPU, context states can determine how an individual processing unit functions and/or in what mode the processing unit functions. Some examples of processing units are a vertex fetch and decode (VFD), a vertex shader (VS), a shader processor, or a geometry processor. In order to utilize these context states, GPUs and GPU pipelines can use context registers and programming data. A GPU may generate a workload, e.g., a vertex or pixel workload, in the pipeline based on the context register definition of a mode or state. Also, certain processing units, e.g., a VFD, can use these states to determine certain functions, e.g., how a vertex is assembled. As these mode or states may change, e.g., the way a vertex is assembled may change, GPUs may need to change the corresponding context. Further, the workload that corresponds to the mode or state may follow the changing mode or state.

Figure 2:
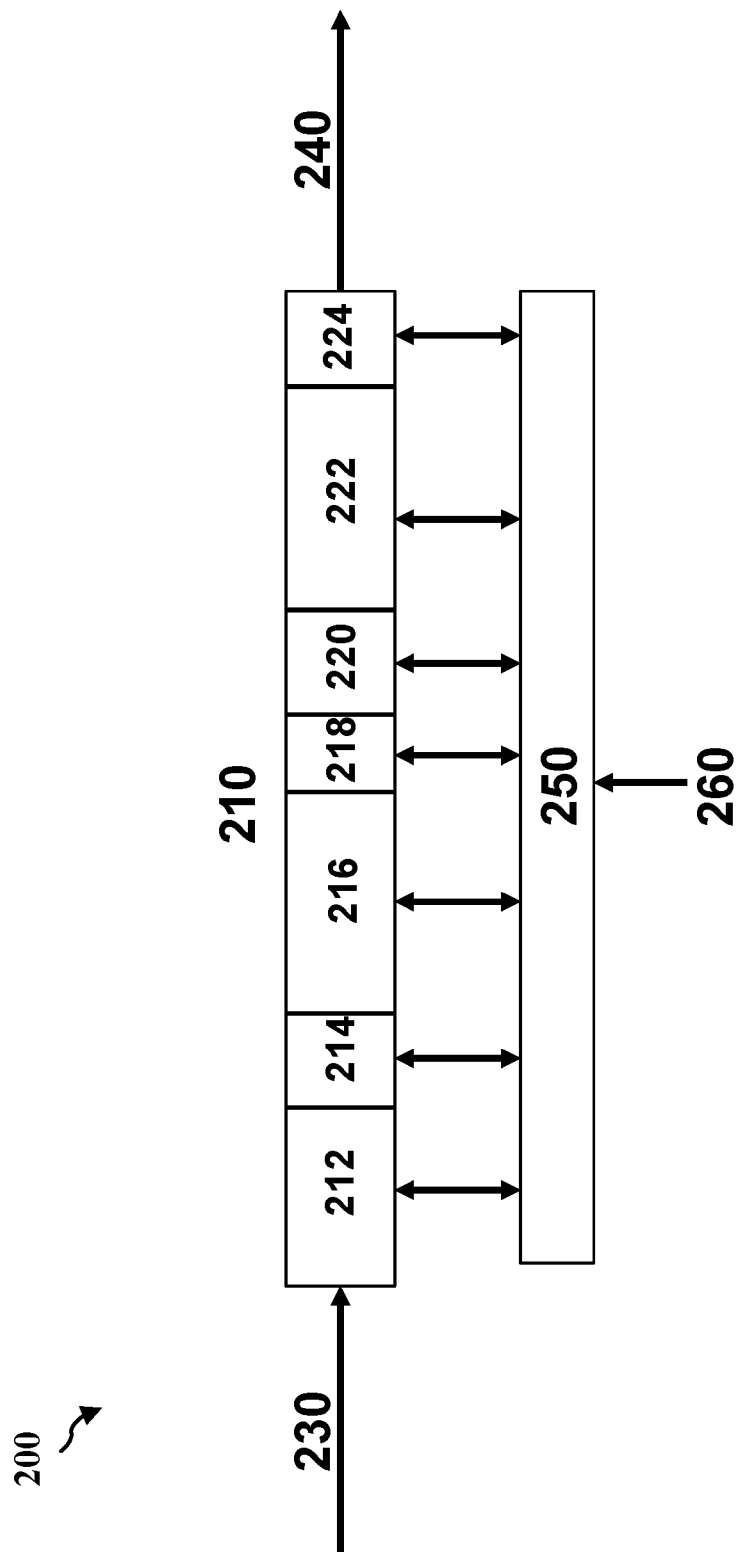
FIG. 2 illustrates an example GPU in accordance with one or more techniques of this disclosure.

FIG. 2 illustrates an example GPU 200. More specifically, FIG. 2 displays that GPU 200 includes single context processing. As shown in FIG. 2, GPU 200 includes a number of processing units, such as VFD 212, primitive controller (PC) 214, VS 216, triangle setup engine (TSE) 218, rasterizer (RAS) 220, pixel shader (PS) 222, and render backend (RB) 224. In some instances, processing units 212-224 can be included in GPU execution pipeline 210. Although FIG. 2 displays that GPU 200 includes processing units 212-224, GPU 200 can include a number of additional processing units. Also, processing units 212-224 are merely an example and any combination of processing units can be used by GPUs according to the present disclosure. GPU 200 also includes draw commands 230, system memory updates 240, context register 250, and programming path 260. In some aspects, GPU 200 can be referred to as GPU pipeline 200.

In FIG. 2, the GPU execution pipeline 210 contains the processing or execution units which take in the commands, e.g., draw commands 230, from a software driver. Also, the processing or execution units can create an image in the form of pixels written to the system memory. For example, the execution pipeline can take the draw commands 230 to initiate execution of a draw call, and use a programming state, e.g., supplied from a driver, to direct the specific details of the draw call to be executed. In some instances, the programming state can be updated prior to each draw call. As mentioned previously, the programming state can be held in the context register 250. Additionally, the context register 250 can hold all the states to execute the draw call, including certain programs used by processing units, e.g., shader programs used by the VS 216 and PS 222. In some aspects, incremental updates may be made to the context register 250 before each draw call, such as a change of state. In instances when there is no update or change of state, context register 250 can maintain its current value.

Figure 3:
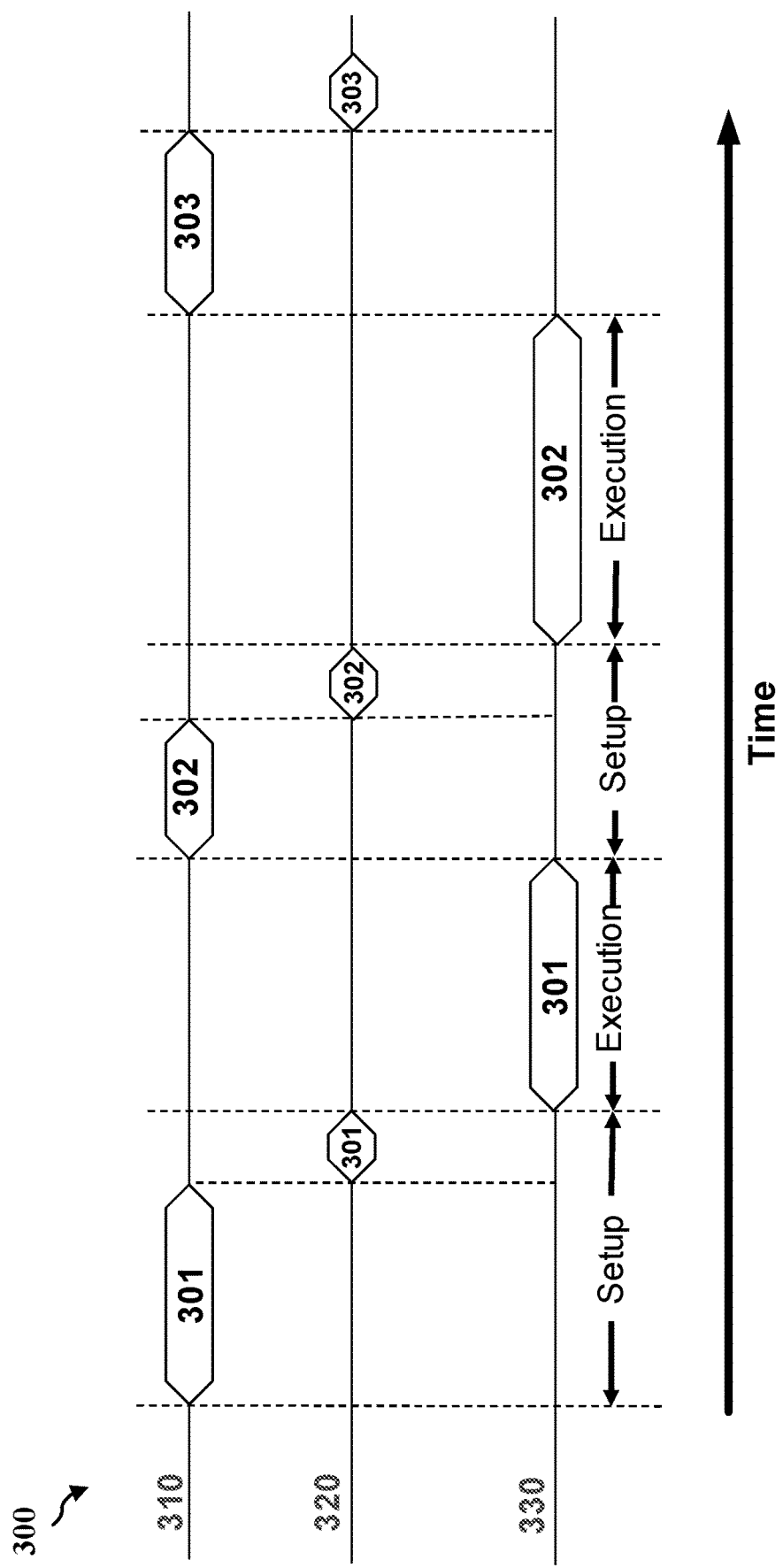
FIG. 3 illustrates an example timing diagram of a GPU in accordance with one or more techniques of this disclosure.

FIG. 3 illustrates an example timing diagram 300 of a GPU. More specifically, FIG. 3 displays the setup and execution for certain GPU commands. As shown in FIG. 3, timing diagram 300 includes draw call 301, draw call 302, draw call 303, programming commands 310, draw commands 320, and GPU executions 330. FIG. 3 shows the programming and execution flow in a simplified GPU, e.g., in GPU 200. As can be seen in FIG. 3, the programming and execution may be serialized. For example, the GPU may not execute the next draw call until the new or incremental state has been programmed. Also, the next state may not be programmed until the current draw call execution is complete, e.g., using the current state. When the GPU sits idle during programming, this can result in performance loss.

In some aspects, a context register may need to be prepared before any draw call data can be processed. As context registers and draw calls can be serialized, e.g., because they are within the same command buffer, it may be beneficial to have an extra context register, e.g., to prepare for the next draw call. Also, in some instances, draw calls of the next context can be fed through the GPU pipeline in order to hide context register programming latency. If a GPU is equipped with multiple sets of context registers, each processing unit can have sufficient context switching capacity to manage smooth context processing. This can enable the GPU to cover pipeline latency that can result from unpredictable memory access latency or extended pipeline processing latency.

As indicated above, in order to hide the programming latency, two sets or banks of context registers can be used. For example, the CP can program one set of context registers while the other set of context registers is executing a draw call. In some instances, the programming can be incremental. For instance, the programming can start by sending a copy command to the GPU, e.g., to copy the old context bank onto the new context bank, after which incremental updates can be performed. In some GPU pipelines, there can be two hardware contexts using these context registers. In some aspects, these hardware contexts can hold programming information. As there may be two contexts, a GPU can program one context while the other context is being read or used. Also, while the draw call is executing, the other context register can be programmed.

Figure 4:
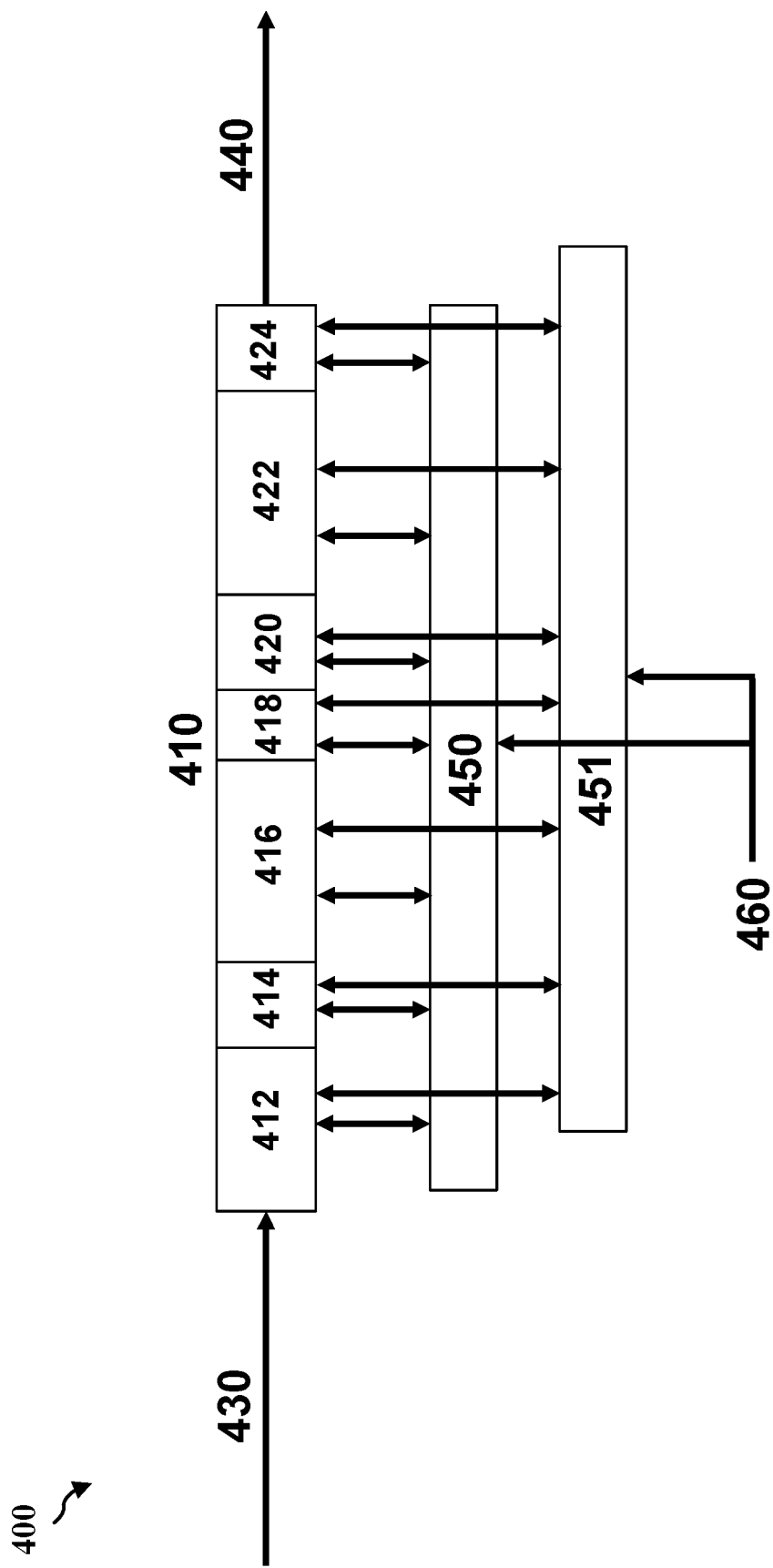
FIG. 4 illustrates an example GPU in accordance with one or more techniques of this disclosure.

FIG. 4 illustrates an example GPU 400. In some aspects, GPU 400 can be referred to as GPU pipeline 400. As shown in FIG. 4, GPU 400 includes VFD 412, PC 414, VS 416, TSE 418, RAS 420, PS 422, and RB 424. Processing units 412-424 can be included in GPU execution pipeline 410. Although FIG. 4 displays that GPU 400 includes processing units 412-424, GPU 400 can include a number of additional processing units. Also, processing units 412-424 are merely an example and any combination of processing units can be used by GPUs according to the present disclosure. GPU 400 also includes draw commands 430, system memory updates 440, and programming path 460.

FIG. 4 also displays that GPU 400 includes dual context processing including context register 450 and context register 451. For instance, GPU 400 implements two sets or banks of context registers, namely context register 450 and context register 451. By using two sets of context registers, the programming and execution can be overlapped. That is, the programming to one context register, e.g., context register 450, can be overlapped with a draw call execution using the state in the other context register, e.g., context register 451. By utilizing two banks of context registers, the programming and the draw call execution can alternate between the two banks. For instance, the context registers can switch at each draw call boundary.

Figure 5:
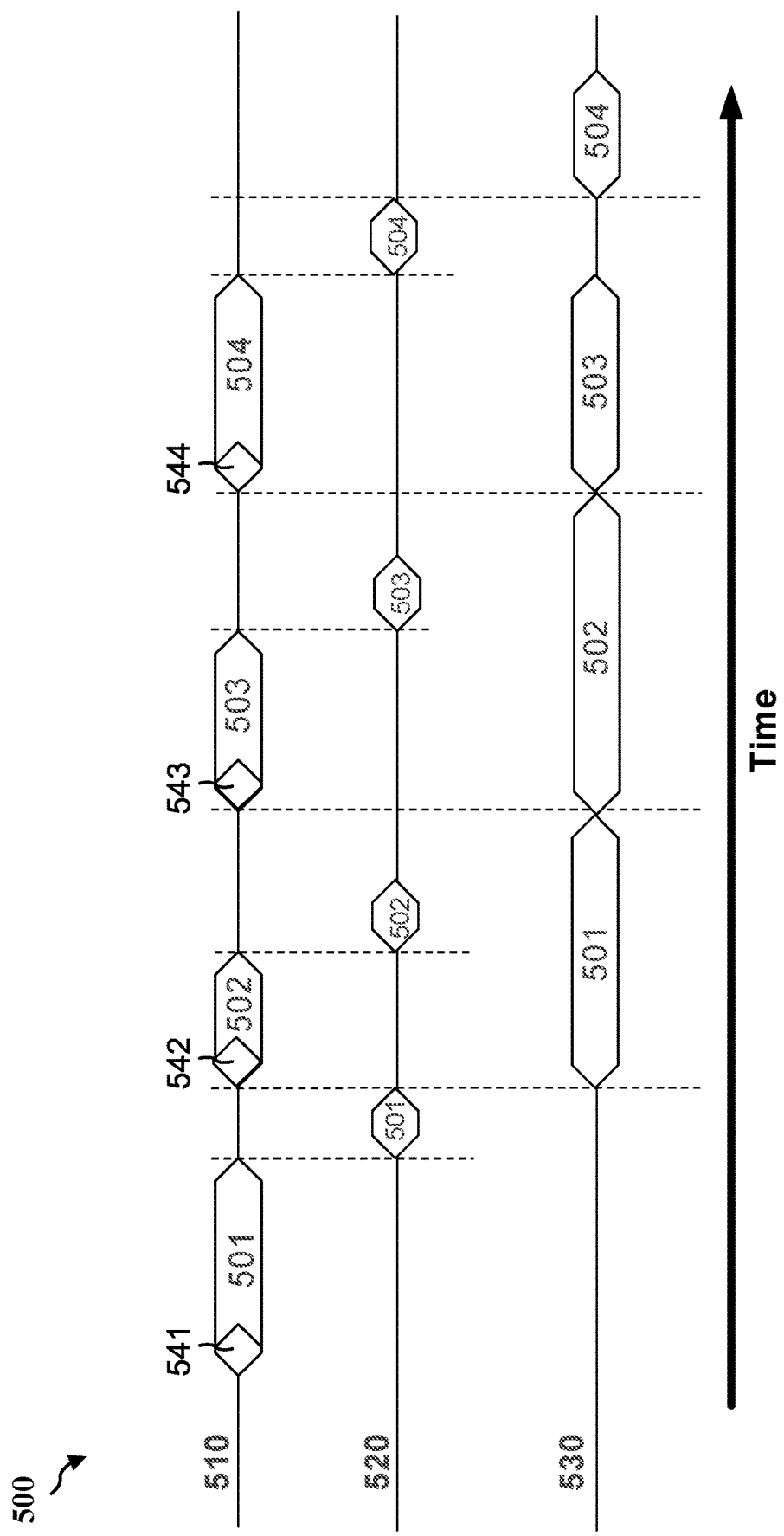
FIG. 5 illustrates an example timing diagram of a GPU in accordance with one or more techniques of this disclosure.

FIG. 5 illustrates an example timing diagram 500 of a GPU pipeline. More specifically, FIG. 5 shows the programming and execution flow in a dual context GPU, e.g., in GPU 400. As shown in FIG. 5, timing diagram 500 includes draw call 501, draw call 502, draw call 503, draw call 504, programming commands 510, draw commands 520, and GPU executions 530. Additionally, FIG. 5 displays that the programming commands 510 can include state copy commands, e.g., state copy commands 541, 542, 543, 544.

As shown in FIG. 5, the programming and execution flow may be serialized utilizing two context banks. For instance, the programming for draw call 502 can occur during the execution of draw call 501. By doing so, once the execution of draw call 501 is complete, draw call 502 can begin executing immediately, as the programming for draw call 502 is already complete. For example, for draw call 501, the programming can be sent to a first context bank. As draw call 501 is the first draw call, the programming for draw call 501 can be complete or full-state. The programming for draw call 502 may be incremental, as it may need to make incremental updates to the state based on draw call 501.

In some aspects, the state in the first context bank may need to be fully copied into the second context bank before any incremental updates are made. This state copy can be performed in the hardware of the GPU. For instance, at the beginning of each programming sequence, a state copy command may be performed, e.g., state copy commands 541, 542, 543, 544. In some instances, a state copy command may cause a set of context registers to be copied from one bank to another bank. FIG. 5 also shows that some state updates can be performed without any corresponding delay. For example, draw calls 502 and 503 can each begin executing immediately following the previous draw call. However, some draw calls may experience a delay following the previous draw call. For example, draw call 504 does not begin executing immediately after draw call 503.

As mentioned above, GPUs may program the next set of context values for the next draw call while the current draw call is executing. By doing so, GPUs can aim to reduce the overhead of programming updates. For example, GPUs may not wait for all the programming updates to finish until after the draw call is finished. Accordingly, one context can be read and executed, while the other context is being programmed in preparation for the next draw call.

In some aspects, the alternating behavior between the two context registers, e.g., alternating programming and draw call execution, may not experience delays if the draw call execution time is at least as long as the programming time. However, a draw call delay can occur when the previous draw call execution time is short, and thus cannot hide the time needed for programming the subsequent draw call. For example, delays can be experienced if there are short or fast draw calls which are shorter than the length of the subsequent programming time. This alternating behavior can also limit the ability to program in advance. For instance, because there may only be two context banks, it may not be possible for the CP to start programming a long command sequence that is more than one draw call ahead of the current active draw call. This can occur even in instances when the programming path is idle.

Figure 6:
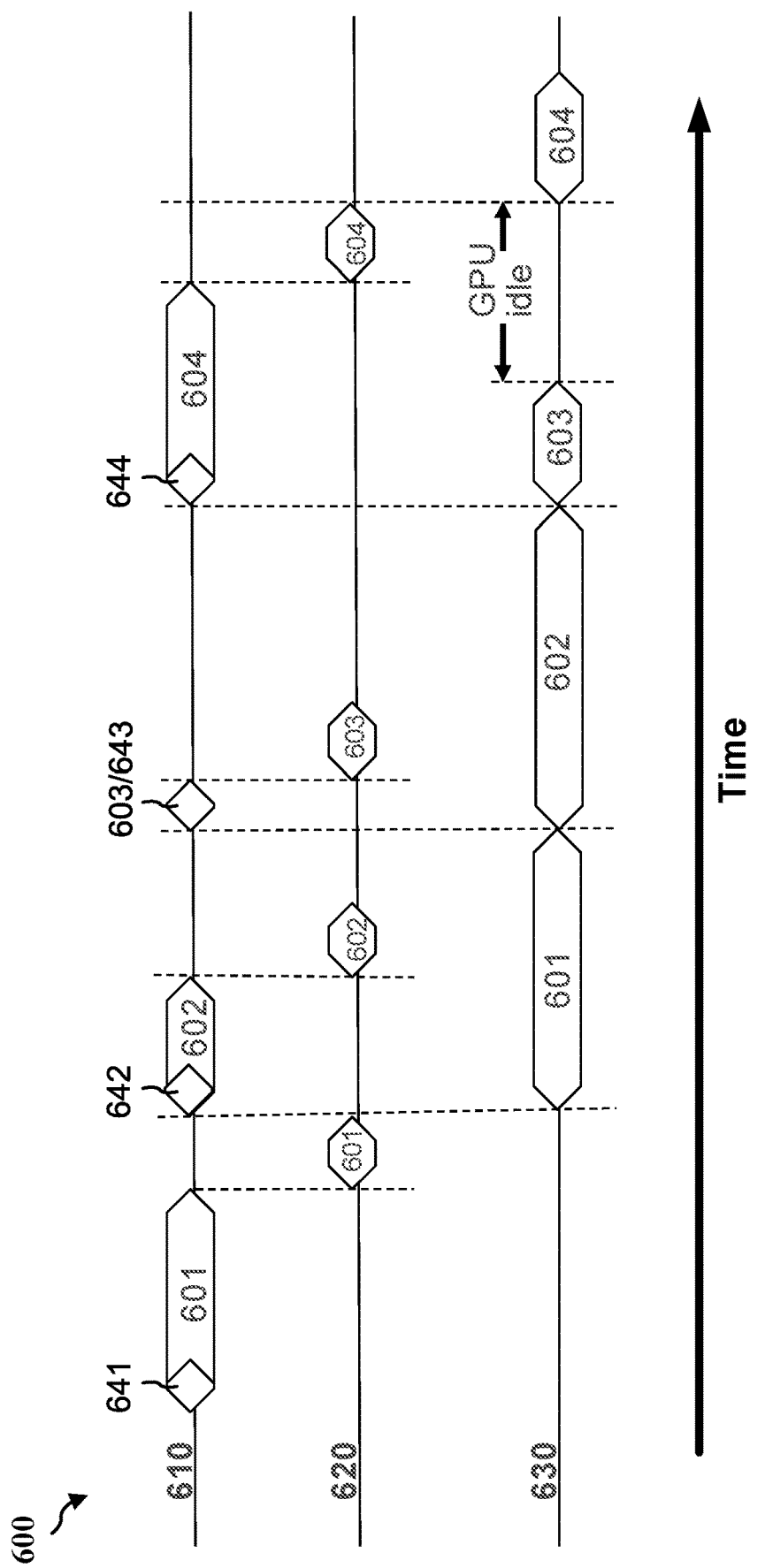
FIG. 6 illustrates an example timing diagram of a GPU in accordance with one or more techniques of this disclosure.

FIG. 6 illustrates an example timing diagram 600 of a GPU. FIG. 6 also shows the programming and execution flow in a dual context GPU. As shown in FIG. 6, timing diagram 600 includes draw call 601, draw call 602, draw call 603, draw call 604, programming commands 610, draw commands 620, and GPU executions 630. Additionally, FIG. 6 displays that the programming commands 610 can include state copy commands 641, 642, 643, 644.

FIG. 6 shows that draw call 603 is small in size compared to draw calls 601, 602, and 604. Also, there may be no incremental state updates for draw call 603. As shown in FIG. 6, although draw call 603 is small, there is still a corresponding state copy command 643 in anticipation of any updates. FIG. 6 also shows that there is a delay between the execution of draw calls 603 and 604, which is noted as the GPU being idle. This delay can be due to the small size of the programming for draw call 603. As indicated previously, as the previous draw calls shrink in size, the execution of the subsequent draw call is susceptible to a delay. For example, as draw call 603 is reduced in size, it can increasingly exposes draw call 604 to a delay. This may be because the programming for draw call 604 is unable to begin until draw call 602 completes executing.

Some GPUs may attempt to solve this aforementioned delay between the execution of draw calls by increasing the number of context banks. For example, if there are N banks, then the programming for draw calls can run ahead by as many as N draw calls. In some instances, this can allow more opportunity to hide the programming behind active draw calls. However, increasing the amount of context banks has a number of disadvantages, including an increase in GPU area and/or a corresponding cost increase.

GPUs herein can also partition or cluster the processing units in the GPU pipeline, such that the GPU pipeline can be broken up into multiple stages. In some aspects, each of these clusters or stages can include two corresponding context registers. In these aspects, GPUs can propagate a draw call through the clusters of the GPU pipeline. As the draw call hits the following stage or cluster in the pipeline, it can use the values programmed into one of the context registers.

Figure 7:
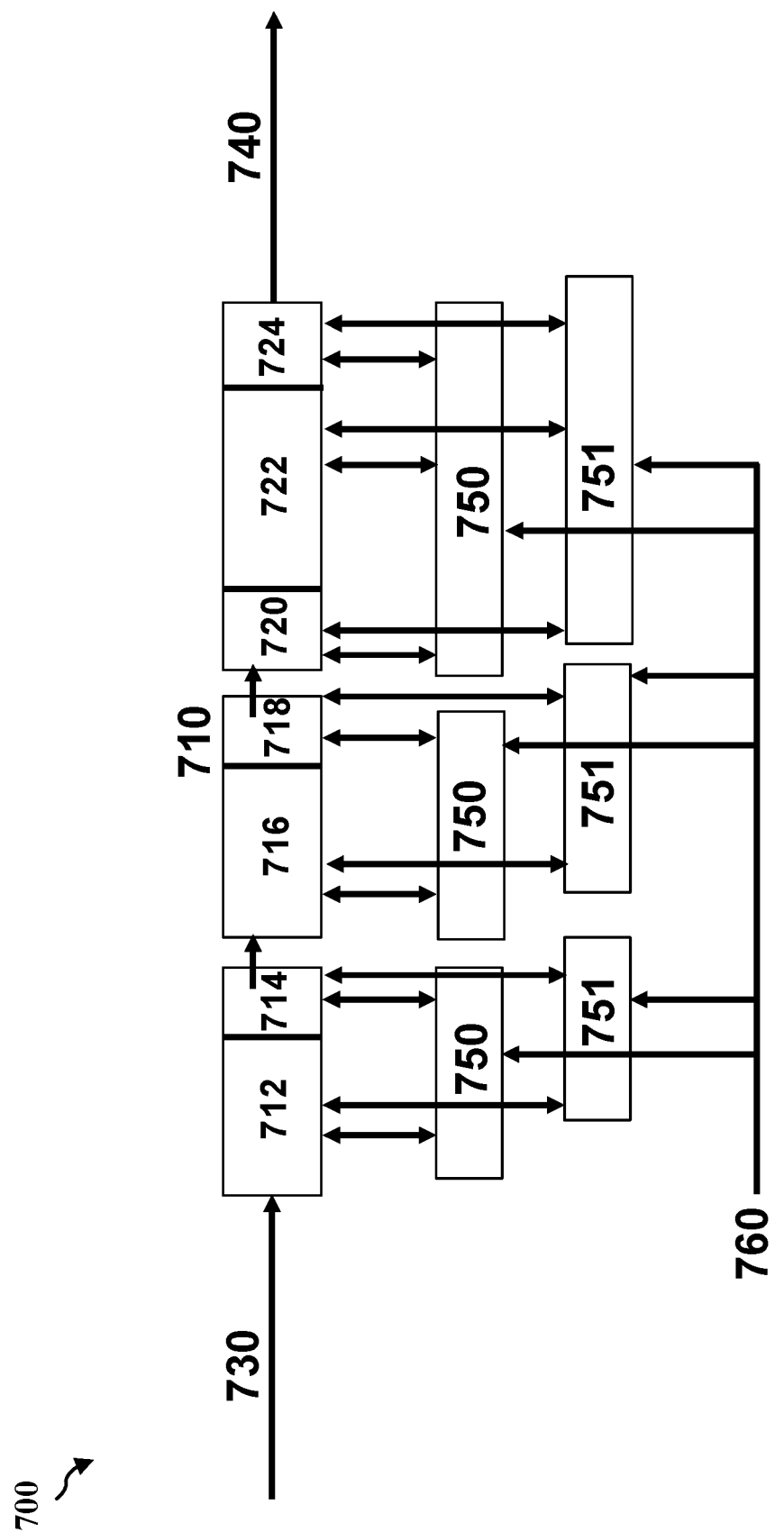
FIG. 7 illustrates an example GPU in accordance with one or more techniques of this disclosure.

FIG. 7 illustrates an example GPU 700 in accordance with one or more techniques of this disclosure. As shown in FIG. 7, GPU 700 includes VFD 712, PC 714, VS 716, TSE 718, RAS 720, PS 722, and RB 724. Also, processing units 712-724 can be included in GPU execution pipeline 710. Although FIG. 7 displays that GPU 700 includes processing units 712-724, GPU 700 can include a number of additional processing units. Also, processing units 712-724 are merely an example and any combination of processing units can be used by GPUs according to the present disclosure. GPU 700 also includes draw commands 730, system memory updates 740, and programming path 760. FIG. 7 also displays that GPU 700 includes dual context processing including context register 750 and context register 751. In some aspects, GPU 700 can be referred to as GPU pipeline 700.

As shown in FIG. 7, context registers 750 and 751 are divided into sets, where a set of context registers corresponds to a cluster of processing units. For example, one set of context registers 750 and 751 correspond to the processing unit cluster including VFD 712 and PC 714. Another set of context registers 750 and 751 can correspond to the processing unit cluster including VS 716 and TSE 718. Yet another set of context registers 750 and 751 can correspond to the processing unit cluster including RAS 720, PS 722, and RB 724.

FIG. 7 displays how GPUs herein can be broken into clusters by dividing the processing units in the GPU pipeline. Essentially, clustering the processing units can allow multiple draw calls to execute in the pipeline concurrently, e.g., where each cluster can execute a different draw call. When clustering processing units, each cluster in the GPU pipeline can have its own set of context banks. For example, VFD 712 and PC 714 can have their own set of context banks 750 and 751, VS 716 and TSE 718 can have their own set of context banks, and RAS 720, PS 722, and RB 724 can have their own set of context banks.

In some aspects, dividing the processing units into clusters can be referred to as using multiple virtual contexts (MVC). Based on the aforementioned clustering, a set of context banks can be applied independently to each cluster within the GPU. In some instances, the number of context registers in each set when clustering processing units can be smaller compared to the number of context registers in each set without clustering. In some aspects, GPUs may stop using one context register, and switch or roll over to the other context register for a cluster of context registers. This can be referred to as context rolling. Context rolling may also limit the number of processing units that can be processed in a cluster. In some instances, this can reduce the throughput for small batches or draw calls that may share programming.

In some cases, the context state or programming may not change or update between two or more consecutive draw calls. In such cases where there are no programming updates, it may not be necessary to copy and program the context registers for the consecutive draw calls. As such, if there are no programming updates, consecutive draw calls can use the same context register. For instance, a second draw call can use the same context state as a first draw call. As the same context state can be used for consecutive draw calls, the same context register can be reused. Accordingly, the reuse of context banks or registers can be referred to as context reuse. In addition, in some aspects, context register reuse can be activated automatically and/or independently, e.g., per cluster and/or per draw call.

Figure 8:
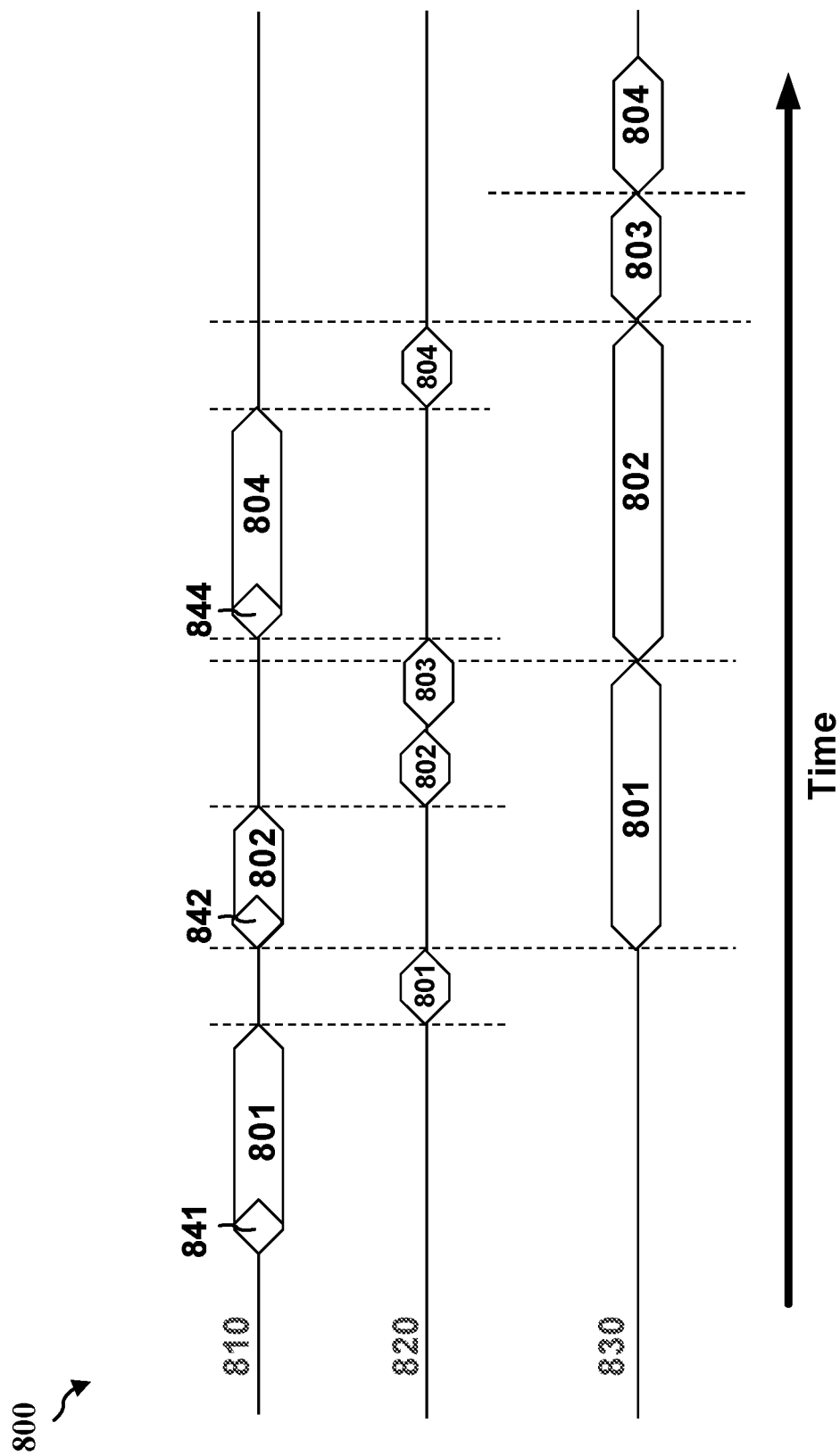
FIG. 8 illustrates an example timing diagram of a GPU in accordance with one or more techniques of this disclosure.

FIG. 8 illustrates an example timing diagram 800 of a GPU in accordance with one or more techniques of this disclosure. More specifically, FIG. 8 shows the programming and execution flow in a GPU utilizing context reuse. As shown in FIG. 8, timing diagram 800 includes draw call 801, draw call 802, draw call 803, draw call 804, programming commands 810, draw commands 820, and GPU executions 830. Additionally, FIG. 8 displays that the programming commands 810 can include state copy commands 841, 842, and 844.

FIG. 8 shows how context reuse can solve the aforementioned problem of delays experienced between the execution of consecutive draw calls. For instance, after determining that there are no programming updates for draw call 803, draw call 803 can utilize the same programming and/or context register as draw call 802. Accordingly, draw call 803 can be executed using the same programming and/or context register as draw call 802. By not updating the programming for draw call 803, this allows the programming for draw call 804 to begin just after the completion of draw call 801, rather than after the completion of draw call 802. Consequently, there can be a reduction in the delay between subsequent draw calls. Based on context reuse, there is no delay between the execution of draw call 803 and draw call 804.

In some aspects, context reuse can be applied continuously, which can allow multiple draw calls to use the same context bank or register, e.g., when there are no programming updates. Additionally, there is no longer any alternating behavior between context registers for consecutive draw calls. As such, each draw call may need to know which context bank to use. Further, each programming update may need to know which context bank to update. In some aspects, GPUs herein may switch the programming path when aware of updates for the next draw call. Also, GPUs herein can supply which context bank to utilize as part of the draw command, e.g., draw command 820. In some instances, context reuse may not be applicable to cases in which there are minimal or non-zero programming updates. However, this can be mitigated when context reuse is applied to a GPU with clustered processing units.

As indicated above, context reuse can be more effective when the GPU is partitioned into processing unit clusters. For instance, there may be a greater likelihood of no programming updates to a cluster of processing units compared to an entire pipeline of processing units. As such, by clustering processing units, there can be a reduction in the delay between the executions of consecutive draw calls. For example, by clustering processing units and utilizing context reuse, it may appear to aspects of the GPU, e.g., the CP, that an extra context bank has been made available. In turn, this can allow the CP to pre-program or start a long programming sequence for two or more draw calls that share the same context state. Accordingly, context reuse can allow the CP to program a long sequence of draw calls in advance, e.g., ahead of the scheduled programming. Additionally, context reuse may have more value when utilized with partitioned or clustered GPUs, i.e., when the GPU pipeline is divided into multiple stages or processing units.

As mentioned above, for each cluster of processing units, if there is no programming update at the context register, then the present disclosure may not roll the context. By doing so, consecutive draw calls may not need to switch context registers, as these draw calls are utilizing the same programming and/or context state. For example, if a draw call is using a first context bank, and there are no programming updates to a second context bank, then the first and second context bank may have the same values, so there is no need for the next draw call to switch to the second context bank and it can keep using the first context bank. As such, switching or rolling context registers may not be beneficial if there are no programming updates.

Further, if there are no programming updates, there is no reason to copy the context states from one context register to another context register. Therefore, a given context register can serve multiple consecutive draw calls or batches if they share the same programming. For instance, programming updates may not be needed when consecutive draw calls do not include new programming details, e.g., moving an object from one portion of a display to another portion may not involve any new programming details. In turn, the CP may allow the consecutive batches or draw calls to use the same context register. In some instances, the CP and/or the cluster logic may need to map the incoming batch to the corresponding hardware context. Additionally, another benefit of context reuse is that more draw calls can be active, i.e., queued behind one another. For instance, draw calls may be active when they share the same context programming. By increasing the number of active draw calls, this can allow for increased GPU throughput.

Figure 9:
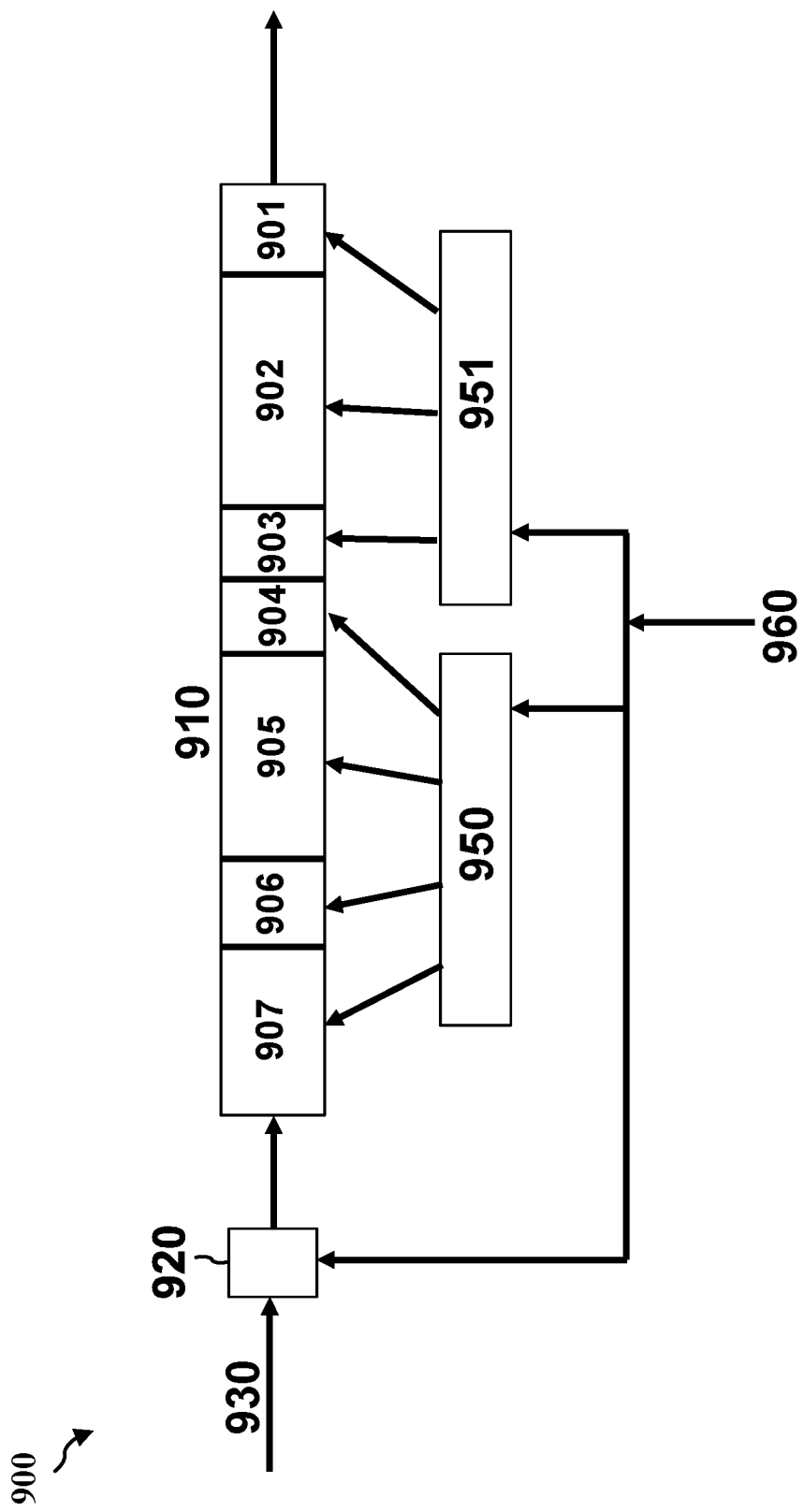
FIG. 9 illustrates an example GPU in accordance with one or more techniques of this disclosure.

FIG. 9 illustrates an example GPU 900 in accordance with one or more techniques of this disclosure. In some aspects, GPU 900 can be referred to as GPU pipeline 900. As shown in FIG. 9, GPU 900 includes multiple draw calls or batches, e.g., batch 901, batch 902, batch 903, batch 904, batch 905, batch 906, and batch 907. Also, GPU 900 includes processing unit cluster 910, mapping table 920, draw call execution flow 930, and programming path 960. FIG. 9 also displays that GPU 900 includes dual context processing including context register 950 and context register 951, each of which can utilize context reuse. In some aspects, context registers 950, 951 may be referred to as context banks 950, 951.

FIG. 9 illustrates one example of context reuse when utilizing partitioned or clustered GPUs. As shown in FIG. 9, context register 951 can store the programming or context for the execution of the draw calls for batches 901-903. Also, context register 950 can store the programming or context for the execution of the draw calls for batches 904-907. Accordingly, context register 951 is reused for batches 901-903 and context register 950 is reused for batches 904-907. As mentioned previously, in some instances, batches 901-907 can be referred to as draw calls, e.g., draw calls 901-907.

As indicated herein, by utilizing context reuse, GPU 900 can use context register 951 for consecutive draw calls, e.g., draw calls 901-903, when there are no programming updates for the consecutive draw calls. For example, if the programming for draw call 902 is the same as the programming for draw call 903, then draw call 903 does not need to roll over and use the programming in context bank 950, as context bank 951 contains the correct programming for both draw calls.

As shown in FIG. 9, there are programming updates for draw call 904, so draw call 904 can switch or roll over to context bank 950. However, there are no programming updates for draw calls 905-907, so context register 950 can be reused for these draw calls. As context reuse allows the GPU to reuse context registers for draw calls with similar programming, this allows the GPU to save storage space, e.g., in the execution pipeline. For example, if draw call 908 (not shown) has new programming, it cannot reuse context bank 950, so it may wait to use context bank 951 until after draw call 903 finishes executing. In some aspects, GPUs according to the present disclosure may utilize more than two context banks, e.g., three or more context banks.

As mentioned herein, FIG. 9 shows the operation of one processing unit cluster, e.g., processing unit cluster 910, where context reuse is active. For instance, processing unit cluster 910 can include batches 901-907. Further, the example in FIG. 9 shows that multiple batches or draw calls can be active in the GPU pipeline, as several consecutive draw calls may use the same programming and/or the same context bank. As indicated above, a draw call can be referred to as a batch, e.g., to emphasize that the GPU can handle different types of workloads.

In some aspects, some clusters may implement context reuse, while other clusters may not. For instance, as a given batch propagates through the clusters, it may need to know which context bank to use for its state, e.g., as the context banks may be changing at different batch boundaries. The present disclosure may aim to solve the cluster boundary problem for batches using a mapping table, e.g., mapping table 920. For example, the mapping table 920 can map batch numbers to different context banks. In some instances, each batch submitted into the GPU pipeline can have a batch identification or sequence number supplied by the driver. As the batch enters a cluster, the mapping table 920 can instruct the batch on which context bank to use. Mapping table 920 can also be referred to as context mapping table 920. In some aspects, the programming path 960 can be used to update the mapping table. Also, the programming path 960 can be utilized for individual clusters, such that only updates relevant to a particular cluster may be present at that cluster.

Additionally, the programming path 960 can utilize a number of different sequences utilizing a number of different commands or instructions, such as programming command, program end (PRG_END) command, graphics copy (GFX_COPY) command, and/or batch command. The programming command may contain the context bank identifier, e.g., the number zero or one, that indicates which context bank to update. The PRG_END and GFX_COPY commands can be special tokens that indicate end-of-programming and state-copy operations, respectively. For instance, the PRG_END command can contain the batch identifier and the context bank identifier. The PRG_END command can also be used to update the mapping table 920. The GFX_COPY command can indicate whether to copy a context state from one context bank to another context bank, e.g., context state 0 to context state 1. If there is no programming for a given batch, then the preceding GFX_COPY can be dropped. Also, the batch command may be present only in the first cluster and contain the batch identifier.

Programming paths can utilize a number of different command sequences. In some aspects, programming path 960 can utilize the following command sequence: {GFX_COPY, programming, PRG_END, batch command}. In the example shown in FIG. 9, the programming path 960 can utilize the following command sequence: {programming (context 951), PRG_END (batch 901, context 951), draw 901, PRG_END (batch 902, context 951), draw 902, PRG_END (batch 903, context 951), draw 903, GFX_COPY (context 951→context 950), programming (context 950), PRG_END (batch 904, context 950), draw 904, PRG_END (batch 905, context 950), draw 905, PRG_END (batch 906, context 950), draw 906, PRG_END (batch 907, context 950), draw 907}. In some aspects, if batch 908 (not shown) needs programming updates and cannot reuse context bank 950, batch 908 may wait for context bank 951 to finish executing batch 903. Once batch 903 exits the cluster, the new programming for context bank 951 can commence.

In some aspects, GPU 900 can update context register, e.g., context register 951, based on a first programming state. As mentioned herein, context registers 950, 951 can be associated with at least one processing unit cluster, e.g., processing unit cluster 910 including batches or draw calls 901-907, in a graphics processing pipeline. GPU 900 can also execute a first draw call function, e.g., draw call 901, corresponding to the first programming state. Moreover, GPU 900 can determine whether at least one additional first draw call function, e.g., draw calls 902-903, corresponds to the first programming state. In some aspects, the at least one additional first draw call function, e.g., draw calls 902-903, can follow the first draw call function, e.g., draw call 901, in the graphics processing pipeline. Also, GPU 900 can execute draw calls 902-903 when the draw calls 902-903 correspond to the first programming state.

Additionally, GPU 900 can update a second context register, e.g., context register 950, based on a second programming state. GPU 900 can also execute a second draw call function, e.g., draw call 904, corresponding to the second programming state of the context register 950. As shown in FIG. 9, the second draw call function, e.g., draw call 904, can follow the at least one additional first draw call function, e.g., draw calls 902-903, in the graphics processing pipeline. Further, GPU 900 can determine whether at least one additional second draw call function, e.g., draw calls 905-907, corresponds to the second programming state of context register 950. As shown in FIG. 9, draw calls 905-907 can follow draw call 904 in the graphics processing pipeline. Also, GPU 900 can execute draw calls 905-907 when the draw calls 905-907 correspond to the second programming state of the context register 950.

In some aspects, determining whether draw calls 902-903 correspond to the first programming state of context register 951 can include comparing draw calls 902-903 and the first programming state. Further, determining whether draw calls 905-907 correspond to the second programming state of context register 950 can include comparing draw calls 905-907 and the second programming state. As shown in FIG. 9, draw call 901 and draw calls 902-903 can be executed at processing unit cluster 910 in the graphics processing pipeline. Also, processing unit cluster 910 can include multiple processing units, where draw call 901 is executed at one of the processing units and draw calls 902-903 are executed at other processing units.

In some instances, the first programming state of the context register 951 can be different from the second programming state of the context register 950. Also, context register 951 can include a first context state and context register 950 can include a second context state. As mentioned herein, GPU 900 can include a CP, where the CP updates context register 951 based on the first programming state. The CP can also update context register 950 based on the second programming state. As further mentioned herein, GPU 900 can include mapping table 920, where mapping table 920 can instruct draw call 901 and draw calls 902-903 to be executed based on the first programming state. Mapping table 920 can also instruct draw call 904 and draw calls 905-907 to be executed based on the second programming state. Further, GPU 900 can include a draw call identification unit, where the draw call identification unit can determine the amount of draw calls to be executed at processing unit cluster 910.

As mentioned herein, context reuse can allow for more draw calls to fit into the GPU pipeline. Context reuse can maximize the existing size of the GPU pipeline. In some instances, small or fast draw calls can help to maximize the size of the GPU pipeline. As indicated above, without context reuse, draw calls may need to wait for previous draw calls to finish executing. However, with context reuse the context banks can share the programming for consecutive draw calls, which can help to increase the amount of draw calls stored in the execution pipeline.

In some aspects, context reuse can be dynamic or changing. For example, a context register may be reused if it contains the current, i.e., not updated, context state for the upcoming draw call. Further, when implementing context reuse, some extra hardware may be added to the GPU. For example, when utilizing context reuse, GPUs herein may include a mapping table, e.g., mapping table 920, to instruct the incoming draw calls on which context register to use. In some instances, the mapping table 920 can be indexed by a draw call identifier, such that its entries can be single bit context register identifiers. As mentioned above, without context reuse there may be no need for a mapping table, as the aforementioned alternating behavior can dictate which context bank should be assigned to which draw call.

In some instances, the CP can determine the draw call identifiers, which can be a simple incrementing sequence that restarts after a certain number of draw calls, e.g., 32 or 64 draw calls. The CP can also determine whether there is any programming for each draw call, as well as which draw call maps to which context bank. Further, the CP can provide the mapping information, i.e., information that allows a draw call to be mapped to a context bank, at the start of the programming sequence. In some aspects, a GPU cluster can update its mapping table with the mapping information. By doing so, as a draw command enters each GPU cluster, the mapping table can indicate which context bank to use. Additionally, in some instances, the CP may utilize context reuse to advance the programming of context registers, such that it can assign programming for draw calls until a new context bank is necessary. The GPU can also provide a done pulse as each draw call completes executing. The CP can utilize the done pulse to determine when a context bank is free for programming, in addition to utilizing the mapping table.

Figure 10:
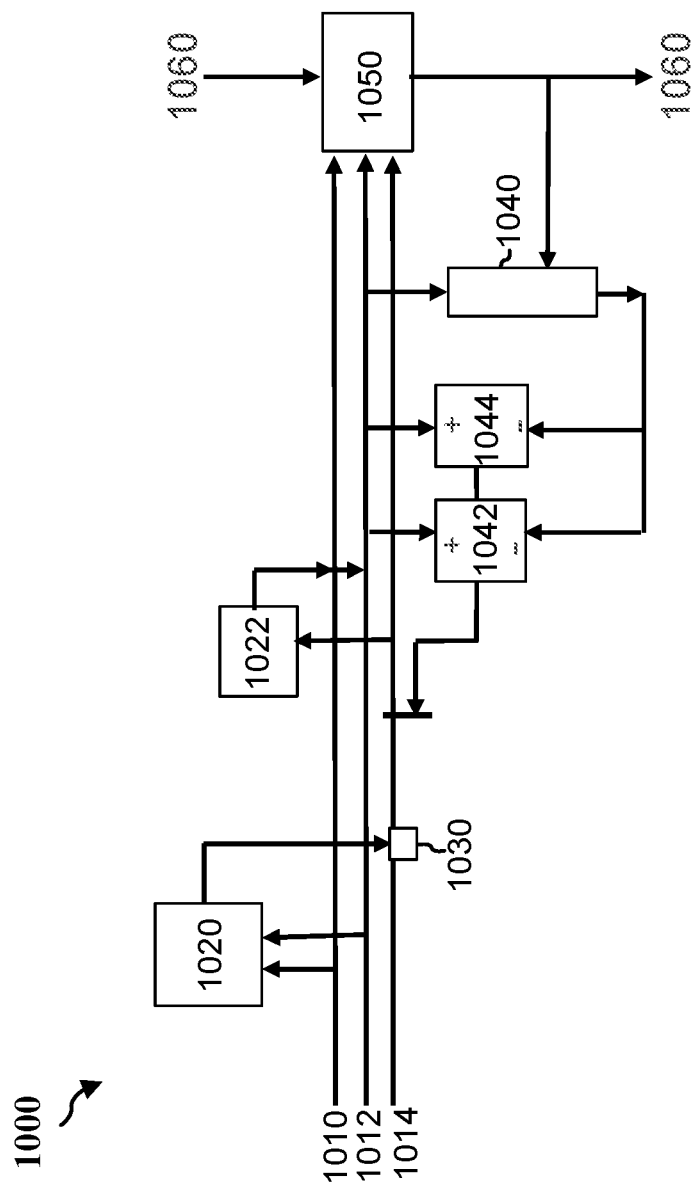
FIG. 10 illustrates an example hardware diagram of a GPU in accordance with one or more techniques of this disclosure.

FIG. 10 illustrates an example hardware diagram of GPU 1000 in accordance with one or more techniques of this disclosure. As shown in FIG. 10, GPU 1000 includes programming command 1010, PRG_END command 1012, and GFX_COPY command 1014. Additionally, GPU 1000 include programming search unit 1020, context unit 1022, GFX_COPY suppression unit 1030, and draw call identification unit 1040. Further, GPU 1000 includes counter 1042, counter 1044, cluster 1050, and context done command 1060.

FIG. 10 shows that the hardware of GPU 1000 can be used to track the context use for a GPU cluster, e.g., cluster 1050. In some aspects, the hardware of GPU 1000 can also insert delays or stalls in the execution of cluster 1050. The programming search unit 1020 can determine if there is any programming for each batch or draw call in the cluster 1050. If so, GFX_COPY command 1014 can be issued along with the programming command 1010. If not, GFX_COPY suppression unit 1030 can suppress or end the GFX_COPY command 1014. Also, the context unit 1022 can toggle the active context.

In some aspects, the number of batches or draw calls that enter the cluster 1050 can be counted, e.g., using counters 1042, 1044. For instance, counter 1042 can count the batches for one context state and counter 1044 can count the batches for another context state. Also, draw call identification unit 1040 can track which context state is used for each batch or draw call. Thus, as each batch exits the cluster 1050, the draw call identification unit 1040 can indicate which counter, e.g., counter 1042 or counter 1044, to decrement. In some instances, when GFX_COPY command 1014 is issued, it may be because the counter 1042 or counter 1044 has an outstanding batch count of zero.

As mentioned above, GPU 1000 can perform context reuse, such that GPU 1000 may not need programming for a subsequent draw call if it uses the same draw values as the previous draw call. Accordingly, GPU 1000 may not need a GFX_COPY command, e.g., GFX_COPY command 1014, prior to executing the draw call. Further, GPU 1000 can continue to reuse the context bank for the consecutive draw calls, as no programming updates are needed for the subsequent draw call. However, if new programming updates are needed for the subsequent draw call, then GPU 1000 may require a GFX_COPY command 1014 prior to programming the new context bank.

GPU 1000 can also utilize stall control logic to ensure that the next set of context registers are not programmed unless there is room for the programming. In some instances, as there are only two context banks, the stall control logic can make sure that only two consecutive new programming updates are used at one time. Accordingly, the amount of new programming updates implemented by GPU 1000 may not exceed the amount of context registers. While context reuse can allow for a number of consecutive draw calls to use the same programming, the amount of new programming updates may still be limited by the number of context registers. For instance, the present disclosure may not overwrite draw calls that are already programmed until they are finished executing. In some aspects, the present disclosure may only utilize the stall control logic to stop or stall any new programming when the amount of draw calls being executed equals the number of context registers.

As indicated previously, cluster 1050 may be a cluster of processing units or one of the partitions in the GPU pipeline. In some aspects, there can be a certain amount of clusters, e.g., six or 12 clusters, that are included in the GPU pipeline. Additionally, each cluster can be programmed independently and each cluster can utilize context reuse. As mentioned above, with context reuse, the amount of draw calls inside the cluster may exceed the number of context registers.

As mentioned above, the draw call identification unit 1040 can track which draw calls are in the cluster 1050. Draw call identification unit 1040 can also be referred to as a context identification box. Draw call identification unit 1040 can also send PRG_END command 1012 to the cluster 1050 to track which context register is in use. Additionally, when a draw call finishes executing, GPU 1000 may determine when the context banks are no longer needed, e.g., when the final draw call finishes executing. In some instances, draw call identification unit 1040 can track when the final draw call finishes executing for a given context register. As indicated above, counter 1042, 1044 can track how many draw calls are using each context bank. For example counter 1042 can actively count how many draw calls are using a first context bank, while counter 1044 can track how many draw calls are using a second context bank. As the draw calls finish executing, the draw call identification unit 1040 can help to decrement the counter 1042, 1044 for each context bank.

In some aspects of the present disclosure, the values for the context registers may be explicitly put into an algorithm or program. As indicated previously, because context reuse can reuse the same context bank more than once, the present disclosure may specify which context bank is being used. Otherwise, the GPU may not be able to determine which context bank should be used for each draw call. As such, each draw call may need to inform the GPU which context bank will be used. As mentioned above, a mapping table can inform each draw call which context bank it will use. Accordingly, as each draw call enters the GPU pipeline, the draw call can be instructed on which context bank to use.

As mentioned herein, new programming updates may need a new context register. In some instances, if the present disclosure determines that there is new programming for a cluster, it can be filtered, such that some of the programming is stored in a cache. For example, the present disclosure can include a cache or filter to store a certain number of programming values written into the cluster, e.g., 16 or 32 programming values. By doing so, when the new programming needs updating, the present disclosure can search the cache or filter to determine if there is any matching programming already in the cache. If all of the new programming updates are similar to the programming already included in the cache, then the new programming updates can be discarded, and the present disclosure can utilize context reuse. As such, if the new programming data matches the existing programming data, then it can be discarded. In turn, if the programming is discarded, then the present disclosure can perform context reuse.

Figure 11:
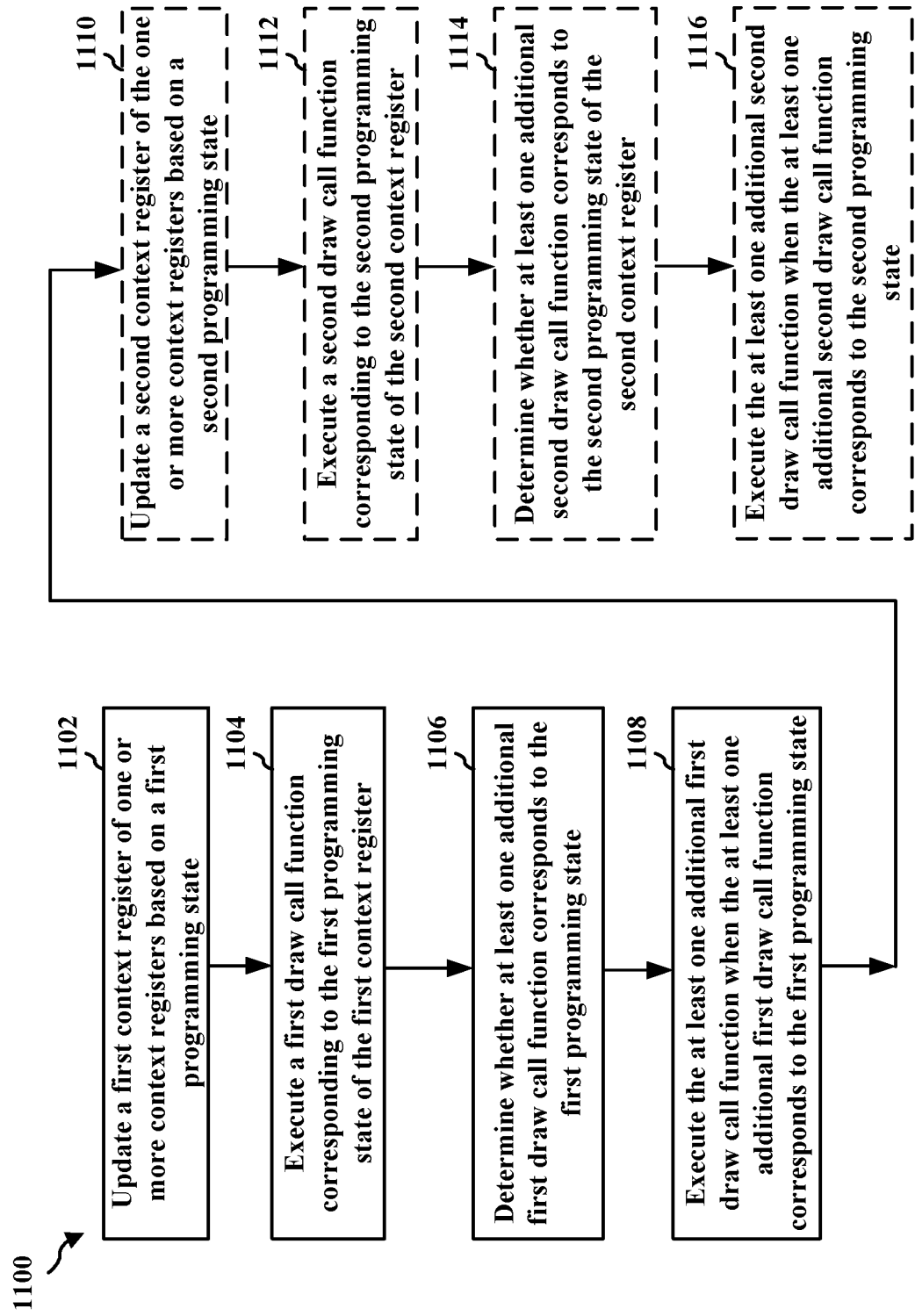
FIG. 11 illustrates an example flowchart of an example method in accordance with one or more techniques of this disclosure.

FIG. 11 illustrates an example flowchart 1100 of an example method in accordance with one or more techniques of this disclosure. The method may be performed by a processing unit, GPU, or apparatus for graphics processing. At 1102, the apparatus may update a first context register of one or more context registers based on a first programming state, as described in connection with the examples in FIGS. 7-10. In some aspects, the one or more context registers can be associated with at least one processing unit cluster in a graphics processing pipeline of the processing unit, as described in connection with FIGS. 7-10. At 1104, the apparatus can also execute a first draw call function corresponding to the first programming state, as described in connection with the examples in FIGS. 7-10. At 1106, the apparatus can determine whether at least one additional first draw call function corresponds to the first programming state, as described in connection with the examples in FIGS. 7-10. In some aspects, the at least one additional first draw call function can follow the first draw call function in the graphics processing pipeline, as described in connection with FIGS. 7-10. At 1108, the apparatus can execute the at least one additional first draw call function when the at least one additional first draw call function corresponds to the first programming state, as described in connection with the examples in FIGS. 7-10.

At 1110, the apparatus can update a second context register of the one or more context registers based on a second programming state, as described in connection with the examples in FIGS. 7-10. At 1112, the apparatus can execute a second draw call function corresponding to the second programming state of the second context register, as described in connection with the examples in FIGS. 7-10. In some aspects, the second draw call function can follow the at least one additional first draw call function in the graphics processing pipeline, as described in connection with FIGS. 7-10. At 1114, the apparatus can determine whether at least one additional second draw call function corresponds to the second programming state of the second context register, as described in connection with the examples in FIGS. 7-10. In some aspects, the at least one additional second draw call function can follow the second draw call function in the graphics processing pipeline, as described in connection with FIGS. 7-10. At 1116, the apparatus can execute the at least one additional second draw call function when the at least one additional second draw call function corresponds to the second programming state of the second context register, as described in connection with the examples in FIGS. 7-10.

In some aspects, when determining whether the at least one additional first draw call function corresponds to the first programming state of the first context register the apparatus can compare the at least one additional first draw call function and the first programming state of the first context register, as described in connection with the examples in FIGS. 7-10. In further aspects, when determining whether the at least one additional second draw call function corresponds to the second programming state of the second context register the apparatus can compare the at least one additional second draw call function and the second programming state of the second context register, as described in connection FIGS. 7-10. Additionally, the first draw call function and the at least one additional first draw call function can be executed at the at least one processing unit cluster in the graphics processing pipeline, as described in connection with the examples in FIGS. 7-10. In some instances, the at least one processing unit cluster can include multiple processing units, where the first draw call function can be executed at one of the multiple processing units and the at least one additional first draw call function can be executed at another of the multiple processing units, as described in connection with the examples in FIGS. 7-10. In some aspects, the processing unit can be a GPU.

In some aspects, the first programming state of the first context register can be different from the second programming state of the second context register, as described in connection with the examples in FIGS. 7-10. Moreover, the first context register can include a first context state and the second context register includes a second context state, as described in connection with the examples in FIGS. 7-10. In further aspects, the graphics processing pipeline can include a command processor, where the command processor can update the first context register based on the first programming state and the second context register based on the second programming state, as described in connection with the examples in FIGS. 7-10.

In some instances, the graphics processing pipeline can include a context mapping table, where the context mapping table can comprise information indicating that the first programming state corresponds to the first draw call function and the at least one additional first draw call function and indicating that the second programming state corresponds to the second draw call function and the at least one additional second draw call function, as described in connection with the examples in FIGS. 7-10. In addition, the graphics processing pipeline can include a draw call identification unit, where the draw call identification unit may determine the amount of draw calls to be executed at the at least one processing unit cluster in the graphics processing pipeline, as described in connection with the examples in FIGS. 7-10.

In one configuration, a method or apparatus for operation of a GPU is provided. The apparatus may be a GPU or some other processor in graphics processing. In one aspect, the apparatus may be the processing unit 120 within the device 104, or may be some other hardware within device 104 or another device. The apparatus may include means for updating a first context register of one or more context registers based on a first programming state, where the one or more context registers are associated with at least one processing unit cluster in a graphics processing pipeline of the GPU. The apparatus may also include means for executing a first draw call function corresponding to the first programming state of the first context register. Also, the apparatus may include means for determining whether at least one additional first draw call function corresponds to the first programming state of the first context register, where the at least one additional first draw call function follows the first draw call function in the graphics processing pipeline. The apparatus may also include means for executing the at least one additional first draw call function when the at least one additional first draw call function corresponds to the first programming state of the first context register. Additionally, the apparatus can include means for updating a second context register of the one or more context registers based on a second programming state. The apparatus can also include means for executing a second draw call function corresponding to the second programming state of the second context register, where the second draw call function follows the at least one additional first draw call function in the graphics processing pipeline. Moreover, the apparatus can include means for determining whether at least one additional second draw call function corresponds to the second programming state of the second context register, where the at least one additional second draw call function follows the second draw call function in the graphics processing pipeline. Further, the apparatus can include means for executing the at least one additional second draw call function when the at least one additional second draw call function corresponds to the second programming state of the second context register.

The subject matter described herein can be implemented to realize one or more benefits or advantages. For instance, the described graphics processing techniques can reduce delays in the processing or execution time within the GPU pipeline. Additionally, the described graphics processing techniques can be used by GPUs or other graphics processors to enable more data or context execution within the GPU pipeline. This can also be accomplished at a low cost compared to other graphics processing techniques. Also, the graphics processing techniques herein can improve or speed up data processing or execution. Moreover, the graphics processing techniques herein can improve a GPU's resource or data utilization and/or resource efficiency.

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules or units are described in this disclosure to emphasize functional aspects of devices configured to perform the disclosed techniques, but do not necessarily require realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:
1. A method of operation of a processing unit, comprising:
updating a first context register of one or more context registers based on a first programming state, wherein the one or more context registers are associated with at least one processing unit cluster in a graphics processing pipeline of the processing unit;
executing a first draw call function corresponding to the first programming state of the first context register;
determining whether at least one additional first draw call function corresponds to the first programming state of the first context register, wherein the at least one additional first draw call function follows the first draw call function in the graphics processing pipeline; and
executing the at least one additional first draw call function when the at least one additional first draw call function corresponds to the first programming state of the first context register.
2. The method of claim 1, further comprising:
updating a second context register of the one or more context registers based on a second programming state, wherein the first programming state of the first context register is different from the second programming state of the second context register.
3. The method of claim 2, further comprising:
executing a second draw call function corresponding to the second programming state of the second context register, wherein the second draw call function follows the at least one additional first draw call function in the graphics processing pipeline.
4. The method of claim 3, further comprising:
determining whether at least one additional second draw call function corresponds to the second programming state of the second context register, wherein the at least one additional second draw call function follows the second draw call function in the graphics processing pipeline; and executing the at least one additional second draw call function when the at least one additional second draw call function corresponds to the second programming state of the second context register.

5. The method of claim 4, wherein determining whether the at least one additional second draw call function corresponds to the second programming state of the second context register comprises:

comparing the at least one additional second draw call function and the second programming state of the second context register.

6. The method of claim 1, wherein determining whether the at least one additional first draw call function corresponds to the first programming state of the first context register comprises:

comparing the at least one additional first draw call function and the first programming state of the first context register.

7. The method of claim 1, wherein the first draw call function and the at least one additional first draw call function are executed at the at least one processing unit cluster in the graphics processing pipeline, wherein the at least one processing unit cluster includes a plurality of processing units, wherein the first draw call function is executed at one of the plurality of processing units and the at least one additional first draw call function is executed at another of the plurality of processing units.

8. The method of claim 1, wherein the processing unit is a graphics processing unit (GPU).

9. The method of claim 2, wherein the first context register includes a first context state and the second context register includes a second context state.

10. The method of claim 2, wherein the graphics processing pipeline includes a command processor, wherein the command processor updates the first context register based on the first programming state and the second context register based on the second programming state.

11. The method of claim 4, wherein the graphics processing pipeline includes a context mapping table, wherein the context mapping table comprises information indicating that the first programming state corresponds to the first draw call function and the at least one additional first draw call function and indicating that the second programming state corresponds to the second draw call function and the at least one additional second draw call function.

12. The method of claim 1, wherein the graphics processing pipeline includes a draw call identification unit, wherein the draw call identification unit determines the amount of draw calls to be executed at the at least one processing unit cluster in the graphics processing pipeline.

13. An apparatus for operation of a processing unit, comprising:

a memory; and at least one processor coupled to the memory and configured to:

update a first context register of one or more context registers based on a first programming state, wherein the one or more context registers are associated with at least one processing unit cluster in a graphics processing pipeline of the processing unit;

execute a first draw call function corresponding to the first programming state of the first context register;

determine whether at least one additional first draw call function corresponds to the first programming state of the first context register, wherein the at least one additional first draw call function follows the first draw call function in the graphics processing pipeline; and execute the at least one additional first draw call function when the at least one additional first draw call function corresponds to the first programming state of the first context register.

14. The apparatus of claim 13, wherein the at least one processor is further configured to:

update a second context register of the one or more context registers based on a second programming state, wherein the first programming state of the first context register is different from the second programming state of the second context register.

15. The apparatus of claim 14, wherein the at least one processor is further configured to:

execute a second draw call function corresponding to the second programming state of the second context register, wherein the second draw call function follows the at least one additional first draw call function in the graphics processing pipeline.

16. The apparatus of claim 15, wherein the at least one processor is further configured to:

determine whether at least one additional second draw call function corresponds to the second programming state of the second context register, wherein the at least one additional second draw call function follows the second draw call function in the graphics processing pipeline; and execute the at least one additional second draw call function when the at least one additional second draw call function corresponds to the second programming state of the second context register.

17. The apparatus of claim 16, wherein determining whether the at least one additional second draw call function corresponds to the second programming state of the second context register comprises the at least one processor configured to:

compare the at least one additional second draw call function and the second programming state of the second context register.

18. The apparatus of claim 13, wherein determining whether the at least one additional first draw call function corresponds to the first programming state of the first context register comprises the at least one processor configured to:

compare the at least one additional first draw call function and the first programming state of the first context register.

19. The apparatus of claim 13, wherein the first draw call function and the at least one additional first draw call function are executed at the at least one processing unit cluster in the graphics processing pipeline, wherein the at least one processing unit cluster includes a plurality of processing units, wherein the first draw call function is executed at one of the plurality of processing units and the at least one additional first draw call function is executed at another of the plurality of processing units.

20. The apparatus of claim 13, wherein the processing unit is a graphics processing unit (GPU).

21. The apparatus of claim 14, wherein the first context register includes a first context state and the second context register includes a second context state.

22. The apparatus of claim 14, wherein the graphics processing pipeline includes a command processor, wherein the command processor updates the first context register based on the first programming state and the second context register based on the second programming state.

23. The apparatus of claim 16, wherein the graphics processing pipeline includes a context mapping table, wherein the context mapping table comprises information indicating that the first programming state corresponds to the first draw call function and the at least one additional first draw call function and indicating that the second programming state corresponds to the second draw call function and the at least one additional second draw call function.

24. The apparatus of claim 13, wherein the graphics processing pipeline includes a draw call identification unit, wherein the draw call identification unit determines the amount of draw calls to be executed at the at least one processing unit cluster in the graphics processing pipeline.

25. A computer-readable medium storing computer executable code for operation of a processing unit, comprising code to:

update a first context register of one or more context registers based on a first programming state, wherein the one or more context registers are associated with at least one processing unit cluster in a graphics processing pipeline of the processing unit;

execute a first draw call function corresponding to the first programming state of the first context register;

determine whether at least one additional first draw call function corresponds to the first programming state of the first context register, wherein the at least one additional first draw call function follows the first draw call function in the graphics processing pipeline; and execute the at least one additional first draw call function when the at least one additional first draw call function corresponds to the first programming state of the first context register.

\* \* \* \* \*